(12) United States Patent
Feng et al.

(10) Patent No.: US 8,055,911 B2
(45) Date of Patent: Nov. 8, 2011

(54) METHOD FOR BACKING UP AND RESTORING AN ENCRYPTION KEY

(75) Inventors: Rongfeng Feng, Beijing (CN); Ping Yin, Beijing (CN); Qiuxin Wu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 1088 days.

(21) Appl. No.: 11/886,344

(22) PCT Filed: Dec. 7, 2005

(86) PCT No.: PCT/CN2005/002109
§ 371 (c)(1),
(2), (4) Date: Sep. 14, 2007

(87) PCT Pub. No.: WO2006/097022
PCT Pub. Date: Sep. 21, 2006

(65) Prior Publication Data
US 2008/0192940 A1 Aug. 14, 2008

(30) Foreign Application Priority Data
Mar. 15, 2005 (CN) .......................... 2005 1 0055310

(51) Int. Cl.
| H04L 9/32 | (2006.01) |
| H04L 9/08 | (2006.01) |
| G06F 21/00 | (2006.01) |
| G06F 11/30 | (2006.01) |
| G06F 12/14 | (2006.01) |
| G06F 15/16 | (2006.01) |
| G06F 15/167 | (2006.01) |

(52) U.S. Cl. ........ 713/193; 713/171; 713/182; 713/183; 713/187; 380/278; 380/281; 380/286; 380/288; 709/208; 709/216

(58) Field of Classification Search .................. 380/286, 380/278, 281, 284, 288; 713/171, 182, 183, 713/187, 193; 709/216, 208
See application file for complete search history.

(56) References Cited

U.S. PATENT DOCUMENTS
5,940,507 A * 8/1999 Cane et al. .................... 713/165
(Continued)

FOREIGN PATENT DOCUMENTS
JP 2004023138 1/2004
(Continued)

OTHER PUBLICATIONS
Office Action issued Sep. 21, 2010 by the Japanese Patent Office in counterpart foreign Appln. No. 2008-501135.

*Primary Examiner* — Mohammad Reza
(74) *Attorney, Agent, or Firm* — Kinney & Lange, P.A.

(57) ABSTRACT

The present invention allows creation of a backup key for backing up an encryption key inside a source trusted chip, encrypting the encryption key with the backup key, exporting the encrypted encryption key from the source trusted chip and storing it in a storage device, encrypting the backup key for transmission to a trusted third party. If the encrypted encryption key needs to be restored inside a destination trusted chip, the backup key and the encryption key encrypted with the backup key are imported to the destination trusted chip, where the encrypted encryption key is decrypted with the backup key inside the destination trusted chip to obtain the encryption key of the source trusted chip.

11 Claims, 1 Drawing Sheet

U.S. PATENT DOCUMENTS

| | | | |
|---|---|---|---|
| 6,253,326 B1 * | 6/2001 | Lincke et al. | 726/12 |
| 6,560,339 B1 * | 5/2003 | Iwamura | 380/201 |
| 6,754,349 B1 | 6/2004 | Arthan | |
| 7,240,219 B2 * | 7/2007 | Teicher et al. | 713/193 |
| 2004/0236958 A1 | 11/2004 | Teicher et al. | |
| 2006/0021066 A1 * | 1/2006 | Clayton et al. | 726/28 |
| 2007/0150734 A1 * | 6/2007 | Gervais et al. | 713/170 |

FOREIGN PATENT DOCUMENTS

| | | |
|---|---|---|
| JP | 200480174 A | 3/2004 |
| JP | 2004282391 | 10/2004 |
| JP | 20055821 A | 1/2005 |
| WO | WO02003271 A1 | 10/2002 |
| WO | WO2004038995 A1 | 5/2004 |

\* cited by examiner

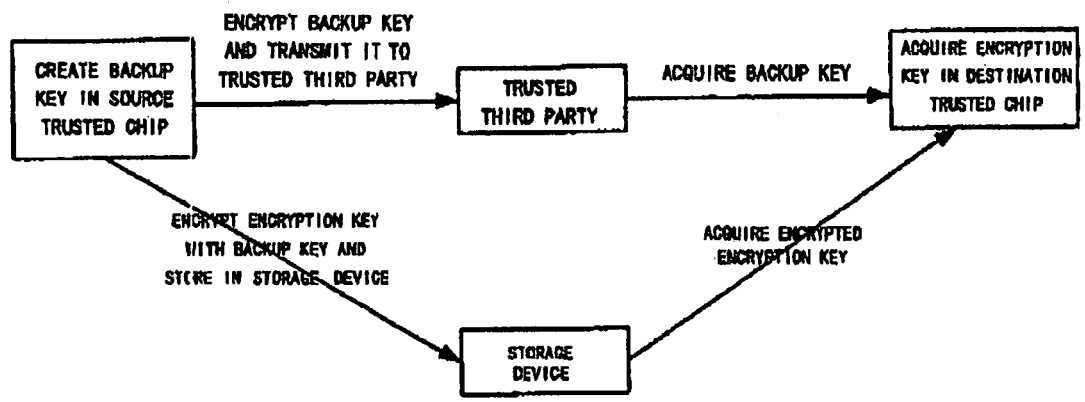

METHOD FOR BACKING UP AND RESTORING AN ENCRYPTION KEY

BACKGROUND OF THE INVENTION

1. Field of Invention

The present invention relates to a method for backing up and restoring an encryption key, in particular to a method for backing up and restoring an encryption key for data encryption/decryption generated by a trusted chip.

2. Description of Prior Art

Today, the society has entered the information age where the computer and network have been gradually applied to various fields. Accompanied by the progress towards higher information technology and the emergence of new network services such as electronic business, the society relies on the computer and network to a growing extent. As a result, information security plays a more important role in the information age, and the requirements on information security are highly strengthened.

The purpose of guaranteeing information security in a better fashion has brought about so-called trusted chip technology, which means providing a trusted chip within a computer so as to encrypt/decrypt data to be protected with the trusted chip. The ability of the trusted chip technology to guarantee information security can be attributed to two critical points. First, the trusted chip utilizes a preset algorithm to generate a random root key, which is firmed in the trusted chip in the form of plain text and operates only inside the trusted chip without any possibility of being read out of the chip. Next, the trusted chip generates a key for data encryption/decryption (hereafter referred to as "encryption key"), which can be exported from the trusted chip only after being encrypted with the root key. On the other hand, the encrypted encryption key can be decrypted with the corresponding root key and revert to its original appearance only after being imported into the trusted chip. In other words, the encryption key can encrypt/decrypt data to be protected only within a specified trusted chip, which is TPM (Trusted Platform Module) or a device similar to TPM.

From the above introduction, it is obvious that the trusted chip can ensure the security for data it encrypts, since the encryption key cannot exist outside the trusted chip in the form of plain text and be employed only within exactly this trusted chip. Due to this characteristic, however, some problems occur as follows.

Once the trusted chip is damaged or invalidated, it is impossible to obtain the encryption key whose existence depends on this trusted chip and thus to decrypt the encrypted data with this encryption key. That is, once the trusted chip is damaged or invalidated, anybody, even the user him/herself, cannot decrypt the encrypted data again, thereby leading to the unavailability of these data.

Although the data the user wants to protect are still present and not be stolen by the third party, it is unacceptable to the user that even he/she cannot access the data.

SUMMARY OF THE INVENTION

In view of the above problems, the present invention aims to provide a method for backing up and restoring an encryption key, which avoids such a defect that data cannot be decrypted due to the invalidation of a trusted chip when a user uses a terminal equipped with the trusted chip.

In order to achieve this object, the technical scheme is implemented as follows.

A method for backing up and restoring an encryption key applicable to an encryption key for data encryption/decryption and generated inside a trusted chip, a trusted chip in which an encryption key to be backed up is present being set as a source trusted chip, and a trusted chip in which an encrypted encryption key is present being set as a destination trusted chip, comprises steps of:

creating a backup key for backing up the encryption key inside the source trusted chip, encrypting the encryption key with said backup key and exporting the encrypted encryption key from the source trusted chip and storing it;

exporting said backup key from the source trusted chip, setting up the access password of the backup key, encrypting said backup key and its access password together and then transmitting to a trusted third party;

acquiring and storing the received information by the trusted third party;

acquiring the backup key from the trusted third party based on the access password, importing the backup key and the encryption key encrypted with the backup key to the destination trusted chip if the encrypted encryption key needs to be restored inside the destination trusted chip, decrypting the encrypted encryption key with the backup key inside the destination trusted chip and obtaining the encryption key of the source trusted chip.

Preferably, said encrypted encryption key exported from the source trusted chip is stored in a memory device.

Preferably, said memory device comprises a floppy disk, a mobile hard disk or a terminal where the source trusted chip is located.

Preferably, the method further comprises a step of performing identity authentication between the terminal where the source trusted chip is located and the trusted third party before the step of encrypting said backup key and its access password together and then transmitting to a trusted third party; and a step of performing identity authentication between the terminal where the destination trusted chip is located and the trusted third party before the step of acquiring the backup key from the trusted third party based on the access password.

Preferably, said identity authentication between the terminal where the source trusted chip is located and the trusted third party is bilateral identity authentication or unilateral identity authentication; said identity authentication between the terminal where the destination trusted chip is located and the trusted third party is a bilateral identity authentication or unilateral identity authentication.

Preferably, the step of encrypting said backup key and its access password together and then transmitting to a trusted third party comprises steps of acquiring an public key of the trusted third party by the terminal where the source trusted chip is located, encrypting together the backup key and the password with said public key and transmitting the encrypted information to the trusted third party.

Said step of acquiring and storing the received information by the trusted third party comprises steps of directly acquiring the backup key and its corresponding access password encrypted together from the received information and storing them.

Preferably, said step of acquiring the backup key from the trusted third party based on the access password comprises steps of transmitting the access password and the acquired public key of the destination trusted chip to the trusted third party; encrypting the backup key with the public key of the destination trusted chip and transmitting the encrypted information to the destination trusted chip by the trusted third party after it uses its own private key to decrypt the stored backup key and the corresponding access password encrypted together, acquires the backup key and the corresponding access password and confirms the consistence between the received access password and the stored access password corresponding to the backup key; decrypting the received information with the private key of the destination trusted chip and acquiring the backup key by the destination trusted chip.

Preferably, said trusted third party is a device having a trusted chip. Said trusted third party stores the backup key and the corresponding access password encrypted together inside or outside the trusted chip. Said trusted third party fulfills both the decryption with its own private key and the encryption with the public key of the destination trusted chip inside the trusted chip.

Preferably, said backup key is a pair of public and private keys or a symmetrical key. The private key of the back key is transmitted to the trusted third party if said backup key is a pair of public and private keys.

Preferably, the method further comprises a step of returning reception-confirming information by the trusted third party to the terminal where the source trusted chip is located, said reception-confirming information includes the backup key, received time stamp and receiver's certificate information and is RSA-signed.

Preferably, said backup key and the access password are transmitted to the trusted third party immediately or with a delay of preset time period after being encrypted together.

Preferably, said trusted chip comprises security chip TPM.

The essential idea of the present invention is to create a backup key for backing up the encryption key inside the source trusted chip, encrypt the encryption key with said backup key and export the encrypted encryption key from the source trusted chip and storing it in a memory device; to export the backup key from the source trusted chip, encrypt the backup key and then transmit to a trusted third party; if the encrypted encryption key needs to be restored inside the destination trusted chip, to acquire the backup key from the trusted third party import the backup key and the encryption key encrypted with the backup key to the destination trusted chip, decrypt the encrypted encryption key with the backup key inside the destination trusted chip and finally obtain the encryption key of the source trusted chip. As long as the backup key has been trusted to the trusted third party in advance, the encryption key of the source trusted chip can be retrieved from the destination trusted chip and thus used in the decryption of the encrypted data even after the invalidation of the source trusted chip. In this way, it is possible to avoid the disaster that data cannot be decrypted due to the invalidation of a trusted chip when the user uses the terminal equipped with the trusted chip.

Further, with the inventive method, the trusted third party has no access to the encryption key to be protected since he/she holds only the backup key. On the other hand, since the encryption key is encrypted with the backup key, nobody can acquire the encryption key without the participation of the trusted third party, and thus the security guarantee for the encryption key is further enhanced.

Besides, the backup key is transmitted as encrypted, which still further ensures the security for the encryption key to be backed up.

All the operation steps involved in the present invention are secured, reliable and easy to implement.

BRIEF DESCRIPTION OF THE DRAWINGS

The FIGURE shows a schematic diagram for the overall processing flow of applying the present invention.

DETAILED DESCRIPTION OF PREFERRED EMBODIMENTS

Now, the present invention will be described in detail with reference to the FIGURE.

The backup and restoration method is directed to an encryption key which is used in encrypting/decrypting data to be protected and generated in a trusted chip. In addition, a trusted chip in which an encryption key to be backed up is present is set as a source trusted chip, and a trusted chip in which an encrypted encryption key is present is set as a destination trusted chip.

The sole FIGURE shows a schematic diagram for the overall processing flow of applying the present invention, which mainly comprises steps of creating a backup key for backing up the encryption key inside the source trusted chip, encrypting the encryption key with said backup key and exporting the encrypted encryption key from the source trusted chip and storing it in a memory device; exporting the backup key from the source trusted chip, encrypting the backup key and then transmitting it to a trusted third party; acquiring the backup key from the trusted third party based on the access password, importing the backup key and the encryption key encrypted with the backup key to the destination trusted chip if the encrypted encryption key needs to be restored inside the destination trusted chip, decrypting the encrypted encryption key with the backup key inside the destination trusted chip and obtaining the encryption key of the source trusted chip.

Next, the processes of backing up and restoring will be elaborated, respectively.

The following steps are carried out when the encryption key in the trusted chip needs to be backed up.

In step A, the encryption key to be backed up is encrypted, which process comprises creating a backup key for backing up the encryption key inside the source trusted chip, encrypting the encryption key with said backup key and exporting the encrypted encryption key from the source trusted chip and storing it in a memory device. The memory device can be, but not limited to, a floppy disk, a mobile hard disk, a terminal where the source trusted chip is located or the like.

In step B, the created backup key is transmitted to a trusted third party. The concrete process consists of the following steps.

B1. The backup key is exported from the source trusted chip and provided with an access password.

B2. Identity authentication is conducted between the terminal where the source trusted chip is located and the trusted third party, and the process proceeds to the step B3 if the identity authentication is successful. The identity authentication can be bilateral or unilateral, and the former is usually chosen to ensure greater security. Obviously, this step can be omitted so as to proceed directly to the step B3 if the security for both parties can be confirmed even without such authentication.

B3. The terminal where the source trusted chip is located acquires the public key of the trusted third party, utilizes the public key to encrypt the backup key and the access password together and sends the encrypted information to the trusted third party.

The terminal where the source trusted chip is located can acquire the public key of the trusted third party through the authentication in step B2 or in any other manner. There is no restriction on how to acquire the public key.

After completing the encryption of the backup key and the access password, the terminal where the source trusted chip is located can transmit the encrypted information to the trusted third party immediately or postpone the transmission until the encryption key is to be restored. In other words, the transmission to the trusted third party can be delayed for a preset time period, which can be either a long period or a short period. Here, the timing of transmission after the encryption has no limitation.

B4. The trusted third party stores the received information. The trusted third party, as a device equipped with a trusted chip, can store the received information inside or outside this trusted chip.

Here, no constraint will be imposed on the storing duration of the trusted third party, which can keep a long-term storage of the backup key trusted by a user or delete the backup key upon the reception of a command from the user end. Naturally, based on the requirement of the user end, the trusted third party can also inhibit the exposure of the backup key to any other user or unauthorized user. Similarly, according to the requirement of the user end, the trusted third party can transfer the trusted backup key to a user-specified terminal, which is also a device provided with a trusted chip.

B5. The trusted third party returns reception-confirming information to the terminal where the source trusted chip is located. Here, the reception-confirming information includes the backup key, received time stamp and the receiver's certificate information and is transmitted to the terminal where the source trusted chip is located after being RSA-signed. The reception-confirming information can serve as an evidence of reception in case of any possible dispute occurring in the future.

So far, the backup of the encryption key has been accomplished. In practice, the order of steps A and B can be reversed, that is, the step A can be performed before or after the step B.

The following steps are carried out when the encrypted encryption key needs to be restored.

In step C, the terminal where the destination trusted chip is located acquires the backup key from the trusted third party. The concrete process consists of the following steps.

C1. Identity authentication is conducted between the terminal where the destination trusted chip is located and the trusted third party, and the process proceeds to the step C2 if the identity authentication is successful. The identity authentication can be bilateral or unilateral, and the former is usually chosen to ensure greater security. Obviously, this step can be omitted so as to proceed directly to the step C2 if the security for both parties can be confirmed even without such authentication.

C2. The access password and the acquired public key of the destination trusted chip are transmitted to the trusted third party so as to request the acquisition of the backup key.

C3. Having received the request information from the terminal where the destination trusted chip is located, the trusted third party utilizes its own private key to decrypt the stored backup key, acquires the backup key and the corresponding access password, and confirms that the received access password is consistent with the corresponding access password stored in itself. Subsequently, the trusted third party encrypts the backup key with the public key of the destination trusted chip and transmits the encrypted backup key to the terminal where the destination trusted chip is located. The above operations of utilizing its own private key to decrypt the stored backup key and encrypting the backup key with the public key of the destination trusted chip are carried out inside the trusted chip. Only after the encryption is finished, the encrypted backup key can be exported from the trusted chip for further operation.

The trusted third party refuses to return the backup key to the terminal where the destination trusted chip is located if it finds that the received access password is inconsistent with the corresponding access password stored in itself.

C4. After receiving the encrypted backup key from the trusted third party, the terminal where the destination trusted chip is located imports the received information to its own trusted chip, uses its own private key to decrypt the received information and acquires and stores the backup key.

C5. The terminal where the destination trusted chip is located returns reception-confirming information to the trusted third party. Here, the reception-confirming information includes the backup key, received time stamp and the receiver's certificate information and is transmitted to the trusted third party after being RSA-signed. The reception-confirming information can serve as an evidence of reception in case of any possible dispute occurring in the future.

In step D, the encryption key, which has been encrypted with the backup key and located in the memory device, is imported to the destination trusted chip.

In step E, the encrypted encryption key is decrypted with the backup key in the destination trusted chip so as to obtain the encryption key of the source trusted chip.

So far, the restoration of the encryption key has been accomplished. In practice, the order of steps C and D can be reversed, that is, the step C can be performed before or after the step D.

The backup key mentioned above can be a pair of public and private keys or a symmetrical key. The private key of the back key will be transmitted to the trusted third party if the backup key is a pair of public and private keys. The application of public and private key pair is recommended since it gives higher security.

The above trusted chip can comprise, but not limited to, security chip (TPM, Trusted Platform Module) or any device analogous to security chip.

The foregoing description gives only the preferred embodiments of the present invention and is not intended to limit the present invention in any way. Thus, any modification, substitution, improvement or like made within the spirit and principle of the present invention should be encompassed by the scope of the present invention.

What is claimed is:

1. A method for backing up and restoring an encryption key, which is applicable to an encryption key for data encryption/decryption generated inside trusted chips, a trusted chip in which an encryption key to be backed up is present being set as a source trusted chip, and a trusted chip in which an encrypted encryption key to be restored is present being set as a destination trusted chip, the method comprising:
creating a backup key for backing up the encryption key inside the source trusted chip;
encrypting the encryption key with the backup key;
exporting the encrypted encryption key from the source trusted chip;
storing the exported encrypted encryption key;
exporting the backup key from the source trusted chip;
setting up an access password of the backup key;
encrypting the backup key and the access password together;
transmitting the backup key and the access password encrypted together to a trusted third party;
storing the backup key and the access password encrypted together received by the trusted third party;
acquiring the backup key from the trusted third party based on the access password;

importing the backup key and the encrypted encryption key to the destination trusted chip when the encrypted encryption key needs to be restored inside the destination trusted chip; and decrypting the encrypted encryption key with the backup key inside the destination trusted chip to obtain the encryption key of the source trusted chip;

wherein the step of encrypting said backup key and the access password together comprises the steps of:

acquiring a public key of the trusted third party by a terminal where the source trusted chip is located; and encrypting together the backup key and the password with the public key and transmitting the backup key and the access password encrypted together to the trusted third party, wherein the step of storing the backup key and the access password encrypted together received by the trusted third party comprises:

acquiring directly the backup key and the access password encrypted together, and wherein the step of acquiring the backup key from the trusted third party based on the access password comprises the steps of:

transmitting the access password and an acquired public key of the destination trusted chip to the trusted third party;

decrypting the backup key and the access password encrypted together using a private key of the trusted third party to acquire the backup key and the access password;

confirming consistency the access password corresponding to the backup key;

encrypting the backup key with the public key of the destination trusted chip;

transmitting the encrypted backup key encrypted with the public key of the destination trusted chip to the destination trusted chip by the trusted third party; and decrypting the encrypted backup key encrypted with the public key of the destination trusted chip with the private key of the destination trusted chip to acquire the backup key by the destination trusted chip.

2. The method according to claim 1, wherein the encrypted encryption key exported from the source trusted chip is stored in a memory device.

3. The method according to claim 2, wherein the memory device is selected from the group consisting of a floppy disk, a mobile hard disk and a terminal where the source trusted chip is located.

4. The method according to claim 1, further comprising:

before the steps of encrypting the backup key and the access password together and then transmitting the backup key and the access password encrypted together to a trusted third party, performing identity authentication between a terminal where the source trusted chip is located and the trusted third party; and before the step of acquiring the backup key from the trusted third party based on the access password, performing identity authentication between a terminal where the destination trusted chip is located and the trusted third party.

5. The method according to claim 4, wherein the step of performing identity authentication between the terminal where the source trusted chip is located and the trusted third party is selected from the group consisting of bilateral identity authentication and unilateral identity authentication, and wherein the step of performing identity authentication between the terminal where the destination trusted chip is located and the trusted third party is selected from the group consisting of bilateral identity authentication or unilateral identity authentication.

6. The method according to claim 1, wherein the trusted third party comprises a device having a third party trusted chip, wherein the trusted third party fulfills both the decryption of the encrypted backup key with the private key of the trusted third party and the encryption of the backup key with the public key of the destination trusted chip inside the third party trusted chip.

7. The method according to claim 1, wherein the backup key is selected from the group consisting of a pair of public and private keys and a symmetrical key and wherein the private key of the backup key is transmitted to the trusted third party if the backup key is a pair of public and private keys.

8. The method according to claim 1, the method further:

returning reception-confirming information by the trusted third party to a terminal where the source trusted chip is located, the reception-confirming information includes the backup key, received time stamp and certificate information of the trusted third party and is RSA-signed.

9. The method according to claim 1, the method further comprising:

returning reception-confirming information by a terminal where the destination trusted chip is located to the trusted third party, the reception-confirming information includes the backup key, received time stamp and certificate information of the terminal where the destination trusted chip is located and is RSA-signed.

10. The method according to claim 1, wherein the backup key and the access password encrypted together are transmitted to the trusted third party in a manner selected from the group consisting of immediately and with a delay of preset time period.

11. The method according to claim 1, wherein at least one of trusted chip is a security chip TPM.

* * * * *